United States Patent
Hunter et al.

[15] 3,707,030
[45] Dec. 26, 1972

[54] METHOD OF MAKING FIBER LIGHT-PIPE DIFFUSER FOR COLORIMETERS

[72] Inventors: Richard S. Hunter; John S. Christie; Roland D. Robinson, all of Fairfax County, Va.

[73] Assignee: Hunter Associates Laboratory, Inc.

[22] Filed: Oct. 20, 1970

[21] Appl. No.: 82,499

Related U.S. Application Data

[63] Continuation of Ser. No. 705,702, Feb. 15, 1968, abandoned.

[52] U.S. Cl. ...............29/419, 250/227, 65/DIG. 7, 356/186
[51] Int. Cl. ...........................................B23p 17/00
[58] Field of Search ...............250/227, 226, 219 CR; 350/96 B, 320; 65/4, 36, DIG. 7; 356/173, 178, 179, 195, 186; 29/419

[56] References Cited

UNITED STATES PATENTS

| | | | |
|---|---|---|---|
| 3,531,208 | 9/1970 | Ward | 250/226 X |
| 3,177,470 | 4/1965 | Galopin | 250/219 CR X |
| 3,356,854 | 12/1967 | Humphrey | 250/227 |
| 3,530,341 | 9/1970 | Hutchinson | 250/227 X |
| 2,755,390 | 7/1956 | Teichman | 250/277 |
| 3,104,191 | 9/1963 | Hicks et al. | 350/96 |
| 3,244,894 | 4/1966 | Steele et al. | 250/227 |
| 2,755,390 | 7/1956 | Teichmann | 250/227 |

Primary Examiner—Walter Stolwein
Attorney—Max L. Libman

[57] ABSTRACT

In a commercial colorimeter, a device is provided for conducting light from a specimen to several photocells in such a way that each photocell receives geometrically the same illumination from the specimen. By using different filters and spectral responses, differences in photocell signal are used in the colorimeter to provide chromatic information of high precision. It is important that this information not be biased by differences in geometric distribution of light to the different photocell positions. The light-conducting device comprises a bundle of internal light reflecting filaments (light fibers), the filaments of which are individually pre-set in place in the bundle in such a manner as to insure that light from each area of the specimen is distributed in the same proportion to each photocell.

2 Claims, 5 Drawing Figures

PATENTED DEC 26 1972 3,707,030

INVENTORS
Richard S. Hunter
John S. Christie
Roland D. Robinson

BY Max L. Libman
ATTORNEY

INVENTORS
Richard S. Hunter
John S. Christie
Roland D. Robinson

BY Max L. Libman
ATTORNEY

METHOD OF MAKING FIBER LIGHT-PIPE DIFFUSER FOR COLORIMETERS

This is a continuation of application Ser. No. 705,702, filed Feb. 15, 1968, now abandoned.

BACKGROUND OF THE INVENTION

In what has come to be known as the Color Difference Meter type of colorimeter, light is projected from a sample being tested simultaneously to a number of photodetectors, typically three or four in number. Each of these photodetectors is fitted with filters different in spectral transmittance. The photodetectors also may have spectrally different light sensing surfaces. There must be light diffusing or mixing device such as the white lined integrating sphere in the colorimeter described in U.S. Pat. No. 2,574,284. The diffusers and light mixers used in the above mentioned instruments are not completely adequate for this purpose. The light diffusing chamber is sensitive to differences in specular projection as between perfectly clear transparent films and films with some roughness. The main weakness of the diffusing chamber, however, is the tendency of the chamber wall to change from white to yellow with age and thus to change its spectral transmitting properties. The clear plastic block described in U.S. Pat. No. 3,003,388 is stable in spectral character but it is not geometrically uniform in the projection of light from different parts of the specimen to the different phototubes.

The object of the present invention is to describe a multifiber light pipe which is free of both the spectral instability and geometric selectivity of the prior devices. This is important since the accuracy of the resulting color evaluation is based on the assumption that each photocell receives exactly the same color information from all areas of the specimen as the other photocells.

SUMMARY OF THE INVENTION

The present invention takes advantage of the well-known ability of clear plastic or glass fibers to act as "light pipes" for light entering their ends. Due to their almost total internal reflecting quality, they transmit such light with very little attenuation from one end of each fiber to the other. In this case Crofan as manufactured by E. I. duPont is suitable because of its ease and convenience in winding as compared with glass or plastic fibers. This material also has a low refractive index and is best described in Modern Optical Engineering by Warren Smith, published in 1966 by McGraw - Hill. In transmitting light by such a method the slightest loss is compounded in the process. Therefore, the material selected has a lower refractive index than the material surrounding it, thereby reducing loss due to refraction and increasing efficiency of transmission.

If the ends are cut perpendicular to the length, such transmitted light can enter and leave the pipe at the cut ends with little or no reflection loss at these ends. Several bundles of such fibers are used as the diffusing medium in the present invention, light from the specimen entering at one end of the bundle, the fibers of the bundle being branched into smaller bundles to the respective photocells in such a manner that light from each small area of the light-receiving end of the bundle, called the entrance window, is transmitted equally to each of the photocell exit windows. This is accomplished by suitably winding the fibers making up the bundle, as will be explained in more detail below, so that at each small area of the window, a proper number of fibers run from this small area to each of the branch ends to produce the desired distribution of light from this area to the receiving photocells.

DESCRIPTION OF THE INVENTION

The specific nature of the invention as well as other objects and advantages thereof will clearly appear from a description of a preferred embodiment as shown in the accompanying drawings, in which.

Figure 1:
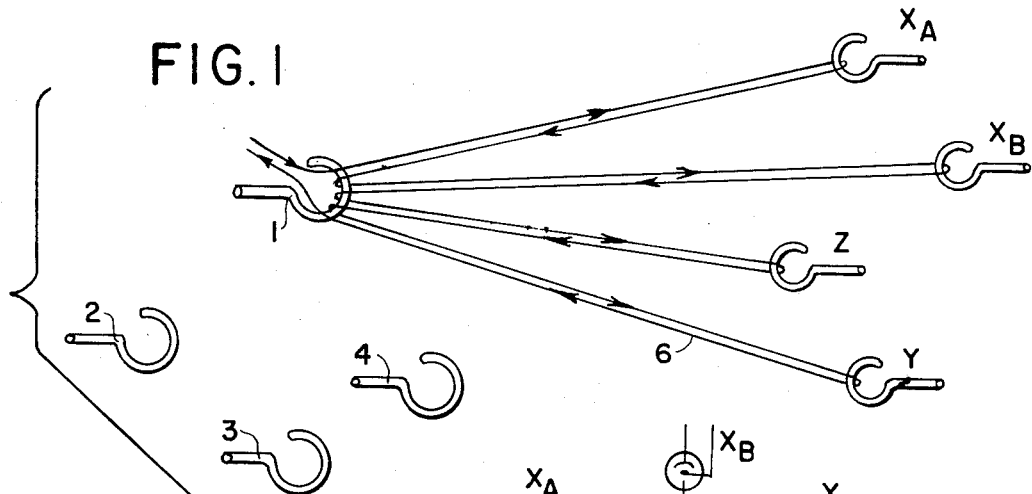
FIG. 1 shows the method of winding fibers according to the invention.
Figure 2:
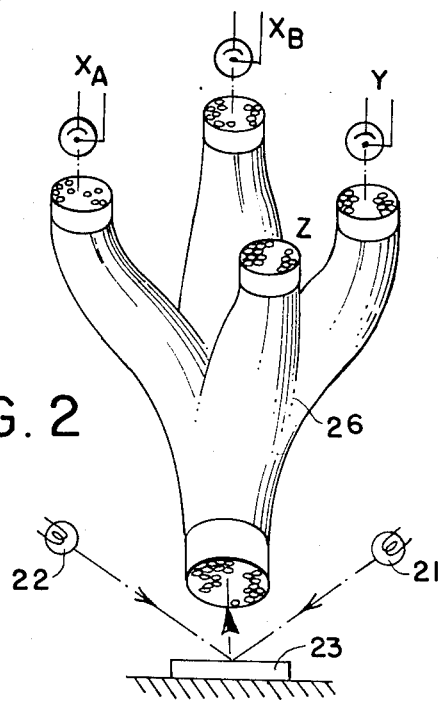
FIG. 2 shows a complete light diffusing bundle of light-transmitting fibers according to the invention.
Figure 3:
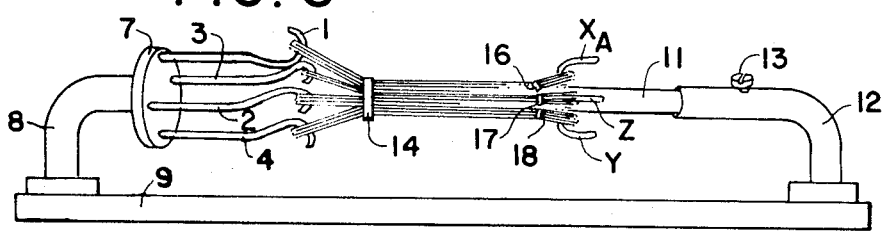
FIG. 3 shows a practical jig for winding fibers in accordance with the method of FIG. 1.

The invention can best be explained by showing how the fiber bundle is wound. As shown in FIGS. 1 and 3, a light-pipe fiber, typically of clear plastic, and approximately 0.010 inch in diameter, is wound between window hook 1 and four photocell hook locations $X_A$, $X_B$, Y, and Z, corresponding to four photocells used in a typical colorimeter, the notations used corresponding to those employed in the formulas upon which the photocells' operation is based, as is well understood in the art. Note that glass fiber, typically 0.001 inch diameter could be used. The fiber 6 is first wound from hook 1, as shown by the arrows, to hook $X_A$, then back to hook 1 and thence to each of the other three hooks in the series, being passed each time back to hook 1 as will be clear from FIG. 1. This forms the basic sub-unit of the fiber bundle assembly described below, and it will be clear that when the ends of the fibers are cut perpendicular to their length, light entering the window at the left-hand end of the small sub-bundle of fibers so formed will be transmiited equally to each of the four locations of the photocells, since the same number of fibers (namely two) go from location 1 to each of the other four locations. After this sub-assembly has been completed, using hook 2, the same process is repeated with another fiber and then repeated again similarly for hooks 3 and 4. The entire process is then repeated until sufficient fibers have been wound. The fibers are then straightened into a bundle such that all of the fibers on hooks 1, 2, 3, and 4 are compressed together to make up the main "window" end of the assembly and a bundle of fibers at each of the photocell hook locations is similarly compressed and assembled to form an assembly somewhat as shown in FIG. 2. A single such bundle could be used, but in order to produce still better diffusion, it is preferred to make up three such bundles, which are fastened together into the final light-pipe assembly shown in FIG. 4. Every fiber is wound in the same rotational direction and secured to each hook in the same sequence, resulting in a continuous periodic pattern.

One can appreciate the necessity for having this non-selective relationship between positions of fibers in the entrance window and those in the separate exit windows if he thinks of the problem of measuring the color of a woven textile fabric made from lustrous or glossy yarns. With these yarns the distributions of reflected light are quite complex because there is surface reflection due to gloss, which is uncolored, and internally reflected light which is colored. When this lustrous yarn is woven into a fabric, it can be appreciated that depending on the geometric character of the woven pattern there will be complex relationships between the distribution of colored light from the interior of each area of fabric and uncolored specular reflection from the yarn surfaces. It is necessary with such a textile specimen to obtain measurements of color which are independent of geometric positions of the photodetectors. Small light fibers are therefore uniformly distributed throughout the entrance window of the colorimeter light-receiving unit to direct light evenly to the separate photodetectors windows.

If the specimen is a woven fabric having a periodic textural design, then the possibility exists that the bundle and specimen may have the same periodic characteristics. The result would be non-uniform reflectance parameters at each photocell. Therefore, the use of three bundles tends to avoid the possibility of a periodic relationship due to textural orientation.

It will be apparent from the method of winding, that the fibers of the sub-assembly formed by the initial fiber 6 in FIG. 1 will tend to be grouped closely together in a given small area of the final window and that light falling on each such small area will therefore necessarily be uniformly distributed to the four photocell locations. Since the entire final assembly of light pipes is composed of such units, the same will be true for each small area of the final assembly. Therefore it must also be very nearly true for the entire window area that any light falling upon any part of the window will be uniformly distributed to each of the four photocell locations, which is the desired result.

FIG. 3 shows a simple jig for carrying out the winding method of FIG. 1. The window end hooks 1–4 are mounted on a base 7 which is suitably fastened, as by means of a pipe 8 to a base 9. The photocell-end hooks $X_A$, etc., are supported in any suitable manner, for example by a pipe 11 telescopically mounted in a support 12 which is also fixed to base 9. By adjusting set screw 13, the hooks can be positioned at the desired distance, and can also be released after the fibers are wound so that the fiber bundle can be removed from all of the hooks. Prior to removing the bundle from the hooks, they will be suitably tied together as indicated at 14 at the window end of the final assembly, and at 16, 17, 18 and 19 for the branching ends which are to go to the photocells.

After all of the fiber bundles have been assembled together, the completed assembly of fibers alone will appear somewhat as shown in FIG. 2, where light sources 21 and 22 project light on the specimen surface 23, which is diffusely reflected as indicated by the arrows to the window end 24 of the glass fiber assembly, from which it is transmitted equally, as above described, to the four photocell locations $X_A$, $X_B$, Z, and Y.

Figure 4:
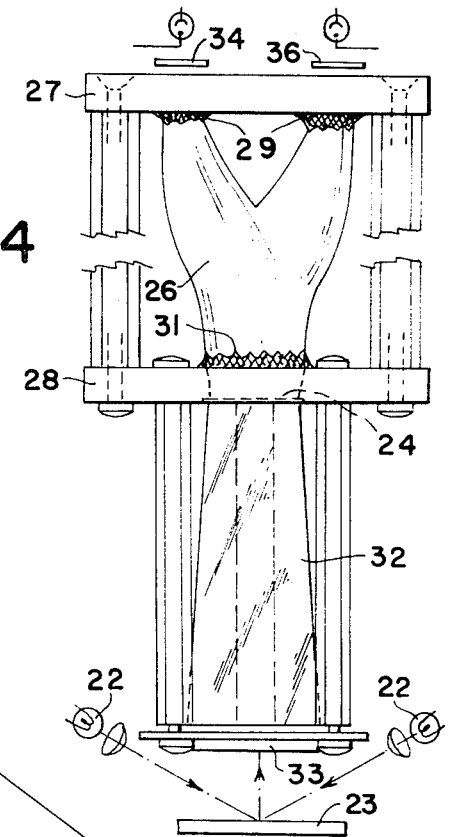
FIG. 4 is a side view of a completely assembled diffuser.

FIG. 4 shows the final fiber assembly 26 housed in a suitable unit for the intended purpose, said unit consisting of two end plates 27 and 28 provided with suitable apertures for receiving the respective ends of the window and of the four photocell branches, each of which is securely cemented in place as indicated at 29 and 31. In order to more conveniently transmit light from the specimen 28 to the window end 24 of the fiber bundle and to provide additional diffusion, a shorter solid light pipe 32 is employed, the ends of which are carefully ground and polished, one end 33 serving as the actual window for receiving light from the specimen 23, while the other end abuts end 24 of the above-described fiber assembly, which has been similarly ground and polished to secure the maximum light transmission at this joint. The entire unit shown in FIG. 4 is suitably mounted in the colorimeter between the specimen 23 and the photocells, or more properly the filters as indicated at 34, 36, which are always employed in conjunction with the photocells for color measurement purposes. The placement of the light pipe in relation to the photodetectors in the completed assembly is shown on FIG. 5.

The details of the colorimeter construction and circuitry are not a part of the present invention, and the present light diffuser can be employed with any known type of colorimeter using photocells and light filters. While the number of branches shown in the present case is four, in some colorimeters only three branches are required, for example, as shown in the Hunter U.S. Pat. No. 3,003,388, and for such service, it will be apparent that the fiber bundle can be made with only three branches and theoretically any number of branches instead of four, otherwise employing essentially the techniques above described. Conversely, if a larger number of branches should be required, the same technique can be used to accomplish this by simply using more hooks at the receiving end. Similarly, if it is desired to provide one or more of the photocell locations with more or less light than the others, this can readily be done by winding more or fewer fibers from the window to that particular location.

The invention also employs the frusto-conical solid light pipe 32 which more conveniently collects and transmits light from the specimen 23 to the window end 24. The conical shape of the pipe increases the light energy transmitted from the specimen to the end 33 of the pipe (in the example shown) by a factor of 2.56 times that which would be transmitted if the light was transmitted directly from specimen 23 to the window end 34 of the fiber bundle. The conical solid light pipe also provides some additional mixing of light rays, as shown by dotted line 35, since the light from specimen 23 is transmitted at an increased angle or angles because of the configuration of the conical solid light pipe and accomplishes the increased diffusion without a commensurate increase in the number of fibers required in the fiber bundle.

Figure 5:
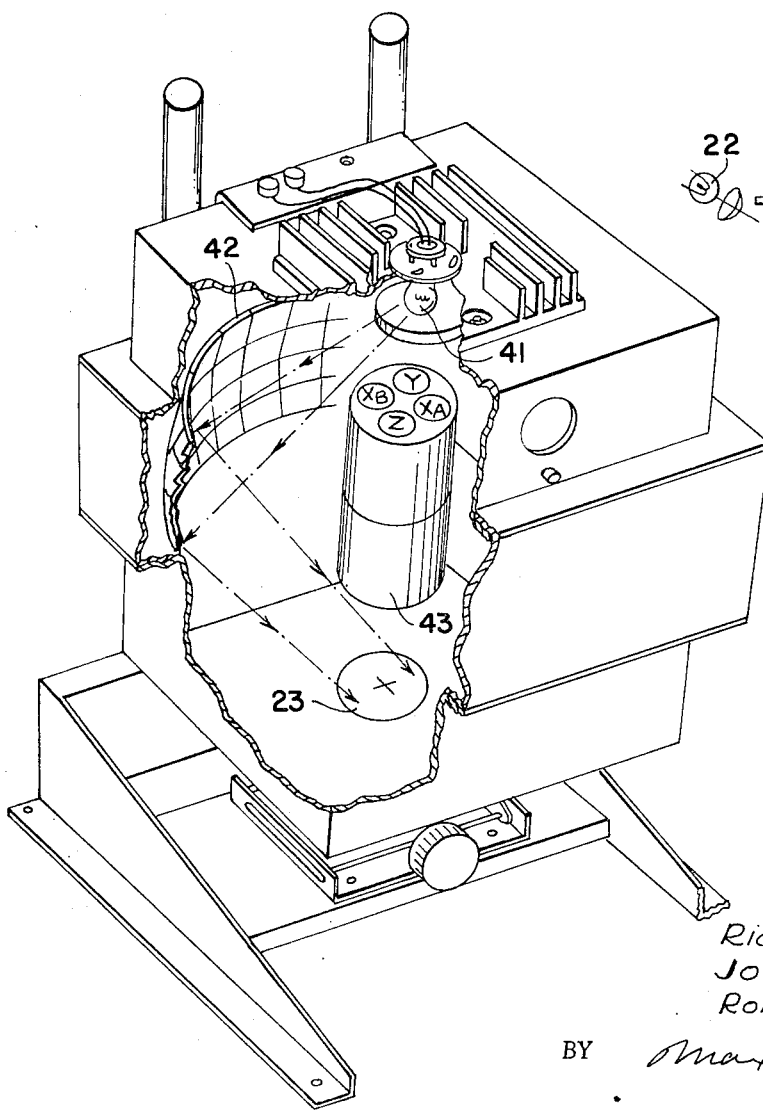
FIG. 5 shows complete optical head of the colorimeter indicating placement of photodetectors and light pipes.

FIG. 5 shows the light pipe assembly as mounted in an optical head using a point source 41 as a light source and a special annular focussed reflector 42 such as described in U.S. Pat. No. 3,525,572, Aug. 25, 1970 of Hunter et al. for concentrating light from the source in a non-directional manner upon the specimen 23. The light pipe assembly is mounted in a suitable housing 43 containing also the photocells $X_A$, $X_b$, Y, and Z shown in FIG. 2. Other details of the head are not a part of the present invention and so need not be described in detail.

It will be apparent that the embodiments shown are only exemplary and that various modifications can be made in construction and arrangement within the scope of our invention as defined in the appended claims.

We claim:

1. Method of making a diffuser for conducting light from a given area to a plurality of reception areas in a predetermined ratio comprising
   a. providing hooks corresponding to each of said areas,
   b. winding a thin flexible light-conducting filament between the hook for said given area and the respective hooks for said reception areas so that the number of filament turns at each reception area is in the predetermined ratio, the number of filament turns at the given area being equal to the total number of filament turns to all of said reception areas,
   c. tying the filament turns at each area into a tight bunch,
   d. cutting the ends of each bunch substantially at right angles to the filaments, the cut area of each bunch corresponding to a desired reception or given area, the total assembly comprising a bundle of light pipes branching from a large bunch at the given area to smaller branch bunches at the reception areas.

2. The invention according to claim 1,
   e. and repeating the entire procedure to produce a plurality of such bundles of light-pipes,
   f. then tying all of the large bunches of the bundles together and respectively tying all of the smaller branch bundles together to form a large diffuser having a large given area and a plurality of reception areas.

* * * * *